(12) United States Patent
Viscor et al.

(10) Patent No.: US 6,891,176 B2
(45) Date of Patent: May 10, 2005

(54) PLANAR ELECTRON EMITTER WITH EXTENDED LIFETIME AND SYSTEM USING SAME

(75) Inventors: Petr Viscor, Jystrup (DK); Michael Jensen, Lyngby (DK); Rolf Stribolt Andersen, Karlsunde (DK); Vladimir Kolarik, Brno (CZ); Armin Delong, Brno (CZ)

(73) Assignee: Nanion ApS, Hedehusene (DK)

( * ) Notice: Subject to any disclaimer, the term of this patent is extended or adjusted under 35 U.S.C. 154(b) by 0 days.

(21) Appl. No.: 10/601,090

(22) Filed: Jun. 20, 2003

(65) Prior Publication Data

US 2004/0256579 A1 Dec. 23, 2004

(51) Int. Cl.[7] ................................................ G11B 9/10
(52) U.S. Cl. .................. 250/492.24; 369/101; 369/121; 361/225
(58) Field of Search ..................... 250/492.24; 369/101, 369/121; 361/225

(56) References Cited

U.S. PATENT DOCUMENTS 5,280,221 A * 1/1994 Okamoto et al. ........ 315/169.1

FOREIGN PATENT DOCUMENTS

| EP | 1 306 870 A2 | 5/2003 |
|---|---|---|
| WO | WO 99/65050 | 12/1999 |

OTHER PUBLICATIONS

Birecki, et al, "Planar Electron Emitter Apparatus with Improved Emission Area and Method of Manufacture", Pub. No: US 2003/0128647 A1, Publication date: Jul. 10, 2003.*
Delong et al., "A 1:1 Electron Stepper", J. Vac. Sci. Technol. B7(6) Nov./Dec. 1989, Pp 1422–1425.*

Poppeller et al., "Hot Electron Emission Lithography", Applied Physics Letters, vol. 73, No. 19, Nov. 9, 1998, pp. 2835–2837.
Delong et al., "1:1 Electron Stepper", Vac. Sci. Technol., B7 (6), Nov./Dec. 1989, pp. 1422–1425.
Delong et al., "1:1 MIM Cathode Electron–Projection Stepper", Microelectronic Engineering 11, 1990, pp. 359–362.
Poppeller et al., "Hot Electron Emission Lithography", Applied Physics Letters, vol. 73, No. 19, Nov. 9, 1998, pp. 2835–2837.
Poppeller et al., "Hot Electron Emission Lithography", Proc. SPIE, vol. 3676, Jun. 1999, Abstract.
Mankos et al., "Imaging Hot–Electron Emission from Metal–Oxide–Semiconductor Structures", Physical Review Letters, Apr. 22, 1996, pp. 3200–3203.
Tromp, "Low–energy Electron Microscopy", IBM J. Res. Develop., vol. 44, No. 4, Jul. 2000, p. 503–516.
Patent Abstracts of Japan: Publication No. 2003045318 A (Feb. 14, 2003), vol. 2003, No. 6, Jun. 3, 2003, 1 page.

* cited by examiner

Primary Examiner—John R. Lee
Assistant Examiner—Zia R. Hashmi
(74) Attorney, Agent, or Firm—Altera Law Group, LLC

(57) ABSTRACT

Metal-insulator-metal planar electron emitters (PEES) have potential for use in advanced lithography for future generations of semiconductor devices. The PEE has, however, a limited lifetime, which restricts its commercial applicability. It is believed that the limited lifetime of the PEE is limited by in-diffusion of metal ions from the anode. The in-diffusion may be countered in a number of different ways. One way is to cool the PEE to temperatures below room temperature. This lowers the metal ion mobility, and so the metal ions are less likely to diffuse into the insulator layer. Another way is to occasionally reverse the electrical potential across the PEE from the polarity used to generate the electron beam. This counteracts the electrical driving force that drives the positively charged metal ions from the PEE anode to the PEE cathode.

58 Claims, 6 Drawing Sheets

PLANAR ELECTRON EMITTER WITH EXTENDED LIFETIME AND SYSTEM USING SAME

FIELD OF THE INVENTION

The present invention is directed generally to planar electron beam devices, and more particularly to Metal-Insulator-Metal tunneling planar electron emitters for lithography applications.

BACKGROUND

Optical lithography has dominated the fabrication of integrated circuits for over 30 years. The general process involves back illuminating a mask with optical radiation, reducing the image of the mask with de-magnifying optics, and then imaging the pattern onto a substrate covered with a layer of photo-resist. Then, with the appropriate photo-resist, the substrate surface (covered with photo-resist) is chemically treated to remove those areas of the photo-resist, which were optically illuminated, thereby transferring a de-magnified image of the mask into the photo-resist. Subsequent chemical etching steps may be utilized to complete the process of transferring a de-magnified image of the mask onto the surface of the substrate material.

The constant competitive driving force in integrated circuits is for smaller and faster devices. Optical lithography has taken the state of the art down to dimensions where the diffraction of light has become the major limiting variable. Creating features smaller than the wavelength of the illuminating light has led to creative optical techniques such as off-axis illumination and phase-shifting masks. Even so, initially utilizing krypton fluoride excimer lasers at 248 nanometers (nm), and more recently argon fluoride excimer lasers operating at 193 nm, the industry standard today for narrow linewidths utilizing optical lithography hovers somewhere around 80 nanometers, slightly less that ½ the wavelength of the 193 nm illuminating laser. Also, at these short ultraviolet (UV) wavelengths material science issues become a practical limiting factor. For example, there are few materials that have sufficient UV transmission at these wavelengths to be used as either refractive lenses in the de-magnifying relay optics or as substrates for the mask assembly.

Given this, several non-optical lithography techniques have been explored by the semiconductor industry. Direct write electron-beam (E-beam) lithography has been researched and commercialized given its potential of wavelengths in the nanometer range. Commercial direct-write E-beam devices are readily available today with resolutions down to 50 nm and slightly below, however, the direct write devices are slow to process a large scale wafer and the search continues for a faster way to utilize the potential resolution available from electron-beam lithography.

Planar electron beam lithography has been investigated for over 20 years with limited commercial success. One configuration commonly referred to as an M-I-M (Metal-Insulator-Metal) planar electron beam lithography (PEBL) device has been constructed and has demonstrated partial technical success. The M-I-M devices consist of an insulator material sandwiched between two conducting metal materials. The individual metal and insulator layers may be made sufficiently thin that when an electrical voltage is applied across the device, electrons from the cathode (the metal with the negative electrical potential) may be driven by the electro-static forces to quantum tunnel into and through the first part of the insulating layer, then drift through the remainder of the insulating layer and anode metal (at the positive potential) and exit the device as free particles, essentially an electron gun. Devices of this type have been fabricated in cross-sectional dimensions as large as 1 inch square, and with appropriate sub-micron masking of the output electron beam, this device configuration opens the possibility of projecting patterns at a 1:1 (one-to-one) ratio in the resist-covered substrate. Also, it has been demonstrated that the exposure time to transfer the entire pattern to the photo-resist in this configuration can be as small as ¹⁄₁₀ of a second, which may allow for rapid processing of large commercial wafers utilizing a step-and-repeat procedure. This rapid pattern transfer rate may give the emerging planar electron beam emitter a technical/commercial advantage over the traditional electron beam devices that write the pattern sequentially in the resist similar to how a television raster scans the screen with a small pencil beam.

However, the useful life of the planar electron emitting devices have historically been sufficiently short so as to limit their applicability to commercially viable manufacturing processes. In view of this, there is a need for a method or technique to prolong the lifetime of planar electron beam emitters for application to electron beam lithography.

SUMMARY OF THE INVENTION

Generally, the present invention relates to approaches to increasing the lifetime of M-I-M planar electron emitters (PEEs). It is believed that one of the important mechanisms in limiting the lifetime of the PEE is related to the in-diffusion of metal ions from the thin metal anode of the PEE into the insulating layer. Once the metal ions diffuse through the thin insulator to the other metal layer, it becomes impossible to maintain an electric potential between the two metal layers, and so no electron beam can be generated.

The approaches of the present invention are directed to reducing the possibility that diffusion takes place and also to reversing the diffusion process. Diffusion is a temperature dependent process; for the first approach cooling the PEE to temperatures below room temperature lowers the metal ion mobility, and so the metal ions are less likely to diffuse into the insulator layer.

In the second approach, the electrical potential across the M-I-M PEE is occasionally reversed from the polarity used to generate the electron beam. This counteracts the electrical driving force that drives the positively charged metal ions from the PEE anode to the PEE cathode, thus increasing the length of time taken for the metal ions to diffuse across the insulator layer from the anode to the cathode.

In one particular embodiment, the invention is direction to a planar electron emitter system for lithography. The system includes a planar electron emitter having a first electrically conducting layer, a second electrically conducting layer that emits electrons, and an insulating layer disposed between the first and second electrically conducting layers. The second electrically conducting layer emits electrons when held at an electrical potential that is sufficiently positive with respect to an electrical potential applied to the first electrically conducting layer. A source of electric potential is electrically connected to the first and second electrically conducting layers so as to impose an electrical potential across the insulating layer. The source of electric potential is adapted so that a polarity of the electrical potential difference between the first and the second electrically conducting layers is reversible.

Another embodiment of the invention is directed to a method of exposing a resist on a wafer using a planar electron emitter. The method includes applying a first electrical potential of a first polarity to the planar electron emitter so that the planar electron emitter emits electrons incident on the resist to expose a first portion of the resist. A second electrical potential of a second polarity, opposite to the first polarity, is applied to the planar emitter so that the planar emitter does not emit electrons.

Another embodiment of the invention is directed to a system for lithography, that includes a planar electron emitter having a first electrically conducting layer, a second electrically conducting layer that emits electrons, and an insulating layer disposed between the first and second electrically conducting layers. The second electrically conducting layer emits electrons when held at an electrical potential that is sufficiently positive with respect to an electrical potential applied to the first electrically conducting layer. A temperature control unit is thermally coupled to the planar electron emitter for controlling temperature of the planar electron emitter.

Another embodiment of the invention is directed to a method of exposing a resist on a wafer using a planar electron emitter. The method includes applying a first electrical potential of a first polarity to the planar electron emitter so that the planar electron emitter emits electrons incident on the resist to expose a first portion of the resist. The method also includes controlling the temperature of the planar electron emitter at a temperature below an ambient temperature.

Another embodiment of the invention is directed to a stepper system for lithography, comprising a planar electron emitter that has a first electrically conducting layer, a second electrically conducting layer that emits electrons, and an insulating layer disposed between the first and second electrically conducting layers. The second electrically conducting layer emits electrons when held at an electrical potential that is sufficiently positive with respect to an electrical potential applied to the first electrically conducting layer. The system also includes a temperature control unit thermally connected to the planar electron emitter for controlling the temperature of the planar electron emitter, a substrate mount for holding a substrate having a resist layer facing the planar electron emitter, and an adjustable stage. The mount is fixed relative to the adjustable stage. The adjustable stage is adapted to move a wafer, when the mount holds a wafer, relative to the planar electron emitter so that successively different portions of resist on the wafer are exposed to electrons emitted from the second electrically conducting layer.

Another embodiment of the invention is directed to a stepper system for lithography that includes a planar electron emitter having a first electrically conducting layer, a second electrically conducting layer that emits electrons, and an insulating layer disposed between the first and second electrically conducting layers. The second electrically conducting layer emits electrons when held at an electrical potential that is sufficiently positive with respect to an electrical potential applied to the first electrically conducting layer. The system also includes a voltage source connected to the first and second electrically conducting layers, the voltage source being adapted to apply a first voltage having a first polarity between the first and second electrically conducting layers, and a second voltage having a second polarity opposite to the first polarity between the first and second electrically conducting layers. There is a substrate mount for holding a substrate having a resist layer facing the planar electron emitter, and an adjustable stage, the mount being fixed relative to the adjustable stage. The adjustable stage is adapted to move a wafer, when the mount holds a wafer, relative to the planar electron emitter so that successively different portions of resist on the wafer are exposed to electrons emitted from the second electrically conducting layer.

Another embodiment of the present invention is directed to a planar electron emitter system for lithography that comprises a planar electron emitter having a first electrically conducting layer, a second electrically conducting layer that emits electrons; and an insulating layer disposed between the first and second electrically conducting layers. The second electrically conducting layer emits electrons when held at an electrical potential that is sufficiently positive with respect to an electrical potential applied to the first electrically conducting layer. The planar electron emitter has a lifetime in excess of one million exposure shots of approximately 100 msec.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
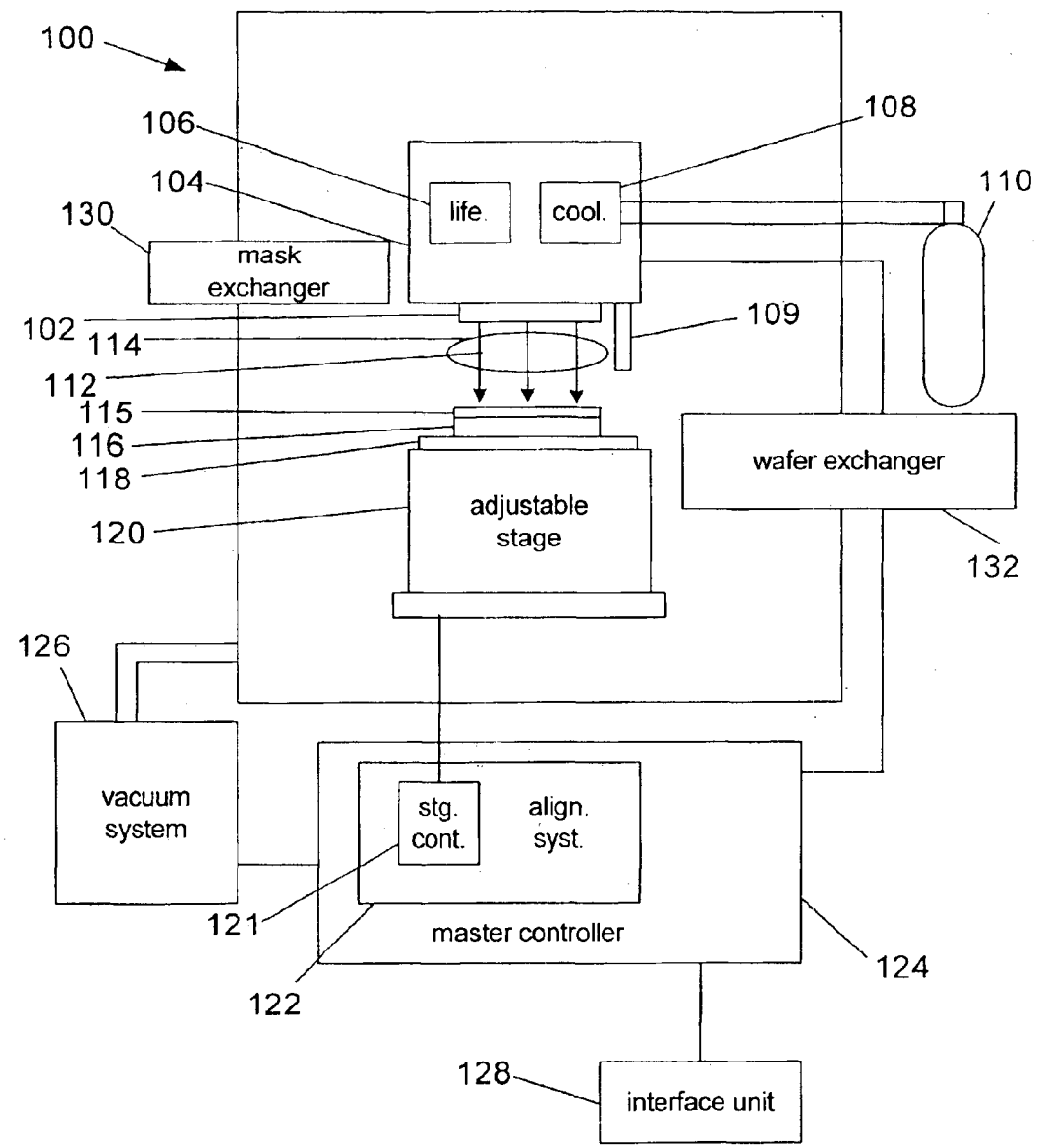
FIG. 1 schematically illustrates an embodiment of a stepper system that uses a planar electron emitter according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to planar electron beam devices and is believed to be particularly useful in Metal-Insulator-Metal (M-I-M) tunneling electron emitters for lithography applications. In the process of integrated circuit (IC) manufacturing, the lithographic pattern transfer may be the most critical and frequent process step since up to 30 different patterns may be transferred to the same wafer before the final device can be packaged and tested for quality assurance.

Planar electron beam lithography (PEBL) has at least two advantages over other next generation lithographic techniques. First, the PEBL technique requires no external ultraviolet, x-ray, or high energy electrons to transfer a pattern from mask to wafer. The electrons needed for pattern transfer are generated within the planar electron emitter (PEE) and the mask is incorporated within the planar electron emitter. And secondly, the entire pattern is transferred simultaneously, whereas competing technologies require "stitching" together a large number of small overlapping patterns.

An embodiment of a planar electron beam lithography system 100 is depicted in FIG. 1. The planar electron emitter (PEE) and integrated mask unit 102 is housed in the mask controller device 104. The mask controller unit 104 may also include a lifetime monitoring device 106 for recording the operational run time and/or number of exposures on the planar electron emitter 102. The lifetime monitoring device 106 may also include an ammeter, voltmeter, network analyzer or other suitable device and may measure the impedance or other electrical properties of the planar electron emitter 102. A temperature control unit 108 may be connected to the planar electron emitter (PEE) and integrated mask unit 102 for controlling the temperature of the PEE and integrated mask unit 102. The temperature control unit 108 may be connected to receive cooling fluid from a fluid source 110. The cooling fluid source may supply liquid nitrogen, liquid helium, or other suitable liquid to cool the planar electron emitter (PEE) and integrated mask unit 102.

The electron beam 112 emanating from the planar electron emitter (PEE) and integrated mask unit 102 may be directed by a projection device 114 to image the mask features at a unity (one-to-one) magnification onto a resist surface of the wafer 116. The projection device 114 may be a magnetic field, operating in concert with an electric field, oriented in such a way so as to focus the electron beam 112 with an effective magnification factor which is variable, depending upon the strength and orientation of the magnetic and electric field.

For one particular approach, the projection device 114 includes a pair of Helmholtz coils, wherein the orientation of the magnetic field lines may be perpendicular to the emitting surface of the planar electron emitter (PEE) and integrated mask unit 102. The projection device 114 may be augmented in the process of "projecting" electrons emitted from the planar electron emitter (PEE) and integrated mask unit 102 by an electric field generated by applying a voltage between the planar electron emitter (PEE) and integrated mask unit 102 and the wafer 116. The polarity of the voltage between the planar electron emitter (PEE) and integrated mask unit 102 and the wafer 116 may be such that the planar electron emitter (PEE) and integrated mask unit 102 is held at a negative potential in the range of 5 kilo-volts (KV) relative to the wafer 116. With this polarity, the applied electric field may cause the emitted electrons emanating from the planar electron emitter (PEE) and integrated mask unit 102 to be accelerated in route to the wafer 116. Also, given the orientation of the magnetic and electric field lines described above, each individual electron's terminal position upon impinging the wafer 116, is uniquely determined by its location where the electron exits the surface of the planar electron emitter (PEE) and integrated mask unit 102. In other words, the angle at which an electron exits the planar electron emitter (PEE) and integrated mask unit 102 (relative to the normal to the surface of the PEE) does not affect the effective magnification of the projection device 114. This is analogous to the classical geometrical optics situation in imaging a point source of radiation to a point source in the image plane. That is, all the radiation emanating from the point source (independent of angle) is focused to a point source in image space, where the location of the image is uniquely determined by the location of the radiating point source. It is in this spirit that the projection device 114 may be referred to as an "imaging device". Given this, with the appropriate choice of orientations and strengths of the magnetic and electric fields, it is possible to "image" the radiating surface of the planar electron emitter (PEE) and integrated mask unit 102 onto the surface of the wafer 116 with one-to-one (1:1) magnification.

The wafer 116 may be mounted on a wafer support unit 118, which in turn may be mounted on an adjustable stage 120. The adjustable stage 120 may be an X-Y-Z, or X-Y-Z-θ, or X-Y-Z-θ-φ (five degree-of-freedom) adjustable stage which may be driven by a stage controller 121, which may be part of an overall alignment system 122. In another approach, the PEE 102 may be adjustable in one or more degrees of freedom to provide movement relative to the wafer. The overall alignment system 122 may be part of a master controller unit 124, which controls the overall mechanical features of the planar electron beam lithography system 100. For example, the master controller unit 124 may control the timing and operation of the vacuum system 126, the alignment system 122, and the planar electron emitter (PEE) and integrated mask unit 102.

An operational sequence of the planar electron beam lithography system 100 may proceed as follows. The master controller unit 124 may generate a command, or receive a command from the interface unit 128 to initiate a deposition run on the wafer 116. The interface unit 128 may couple to a computer or other suitable device to issue electronic commands to the master controller unit 124. The master controller unit 124 may in response to an externally generated command, issue a command to the vacuum system 126 to generate a vacuum on the inner chambers of the planar electron beam lithography system 100 to remove potentially contaminating residual gases in the chamber.

Also, the master controller unit 124 may route a command to the temperature control unit 108 to begin delivering cooling fluid first to the temperature getter device 109 and later to the planar electron emitter (PEE) and integrated mask unit 102. The getter device 109 may also be held at a lower temperature than the planar electron emitter (PEE) and integrated mask unit 102 to preferentially draw potentially contaminating gaseous particle to the temperature getter device 109 and not to the planar electron emitter (PEE) and integrated mask unit 102.

Next, the master controller unit 124 may issue a command to the alignment system 122 and stage controller 120 to orient the wafer 116 in the proper position before initiating electron beam bombardment. The master controller unit 124 may then issue a command to the projection system 114 to set the magnetic and electric field strengths appropriate for the desired one-to-one (1:1) magnification. The command may then be given to apply the necessary voltage signals to the planar electron emitter (PEE) and integrated mask unit 102 to begin electron bombardment on the wafer 116. The master controller unit 124 may include a timer module to issue repetitive commands to the stage controller 120 to periodically translate the wafer 116 in the horizontal directions X and Y (Z being elevation) in a process commonly referred to in the semiconductor industry as "step and repeat".

The above process may be repeated until the wafer 116 has been processed by all the necessary planar electron emitters (PEE) and integrated mask units 102 to achieve the desired structure in the wafer's topology. With the original wafer 116 electron beam lithography completed, the master controller may issue a command to the wafer exchanger unit 132 to remove the original wafer 116 and install the next wafer in the queue to be processed. This procedure may be repeated until all waters scheduled for electron beam lithography are processed.

Once the entire top surface of the wafer 116 has been exposed to electron bombardment via the step and repeat process, it may be necessary to insert a different planar electron emitter (PEE) and integrated mask unit 102 in the mask controller unit 104. The additional planar electron emitter (PEE) and integrated mask unit 102 may be necessary to define additional structures in the wafer's 116 topology. In this event, the master controller 124 may issue a command to the mask exchanger module 130 to remove the original planar electron emitter (PEE) and integrated mask unit 102 and insert the new emitter.

It will be appreciated that modifications to the above process steps are anticipated. For example, once the entire top surface of the "first" wafer 116 has been exposed to electron bombardment via the step and repeat process, in contrast to the above, the planar electron emitter (PEE) and integrated mask unit 102 may stay in place and an additional wafer similar to the "first" wafer 116 may be inserted by the wafer exchanger unit 132 for electron beam lithography. This process may be repeated until all scheduled wafers have been processed by the "first" planar electron emitter (PEE) and integrated mask unit 102. Then, if additional planar electron emitters (PEE) and integrated mask units 102s are needed to fully define the topology of the wafers 116s, additional planar electron emitters (PEE) and integrated mask units 102 may be inserted one-by-one until all of the scheduled wafers 116 have been appropriately processed by selective electron exposure by the planar electron emitters (PEE) and integrated mask units 102.

Figure 2A:
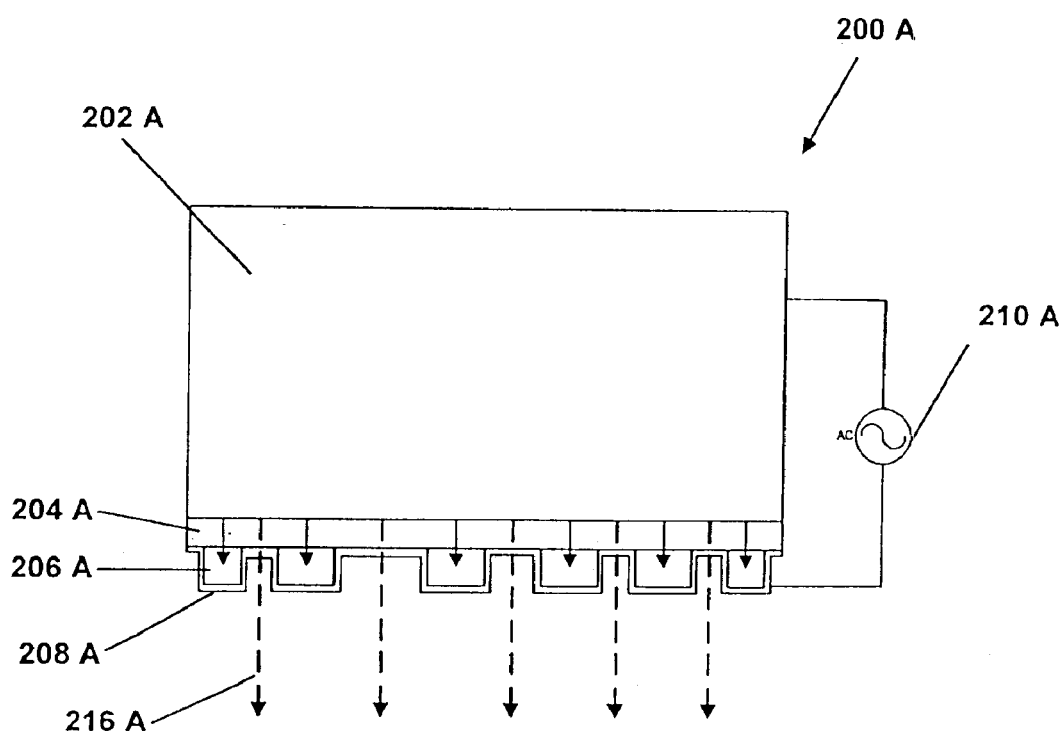
FIGS. 2A–2C schematically illustrate different embodiments of planar electron emitter.

A cross sectional view of one embodiment of a planar electron emitter (PEE) and integrated mask unit 200A in the Metal-Insulator-Metal configuration is shown schematically in FIG. 2A. The metal substrate 202A may be composed of aluminum or other suitable electrically conducting material such as a metal, and serves as the source of electrons for the electron emitter. The conducting substrate 202A may also be referred to as the cathode of the PEE 200A, and is typically formed over a structural substrate, for example a silicon or sapphire structural substrate.

A thin insulating layer 204A may be formed on the substrate 202A, for example by over-coating or by chemical treatment. The thin insulating layer 204A may include aluminum oxide ($Al_2O_3$) or other suitable insulating material. In the configuration shown in FIG. 2A, a pattern layer 206A (composed of the resist remaining after a step of chemical etching) has been fabricated on the exposed surface of the insulator layer 204A by standard lithographic techniques. The pattern layer 206A has been over-coated with a thin metal overlay 208A. The thin metal overlay 208A may be composed of gold or other suitable metal. Typical thickness dimensions for the individual layers may be;

conducting substrate 202A thickness: 1 micron insulating layer 204A thickness: 100 Angstroms metal overlay 208A thickness: 100 Angstroms It will be appreciated that the thickness of each layer may be greater or less than these typical dimensions. Furthermore, the PEE may be made using different materials. The conducting substrate may be formed from many different types of electrically conducting materials, including metals and conducting semiconductor materials. For the purposes of this description, the first "Metal" in "Metal-Insulator-Metal" is assumed to include electrically conducting semiconductors. For example, the conducting substrate may be formed from electrically conducting silicon, the insulating layer may be formed from silicon dioxide and the thin metal overlay may be aluminum.

To initiate electron emission from the planar electron emitter (PEE) and integrated mask unit 200A, an electrical potential (voltage) 210A is applied between the conducting substrate 202A (negative lead) and the metal overlay 208A (positive lead). For the dimensions and materials shown above, a 5-volt potential may be sufficient to commence electron emission. With the applied voltage 210A, electrons from the surface of the metal substrate 202A may receive a sufficient driving force to quantum tunnel into and then drift through the remaining thickness of the insulating layer 204A. Upon exiting the insulating layer 204A, those electrons that propagate into the resist left behind in the lithographic process to define the mask 206A are absorbed by the resist material. The remaining electrons that propagate through the insulating layer 204A and exit in regions where the resist was etched away, continue on, propagating through the metal overlay 208A and exit the planar electron emitter (PEE) and integrated mask unit 200A as free-space propagating electrons 216A. The free space propagating electrons 216A are subsequently incident on the resist layer on the wafer, so as to selectively expose portions of the resist layer.

Figure 2B:
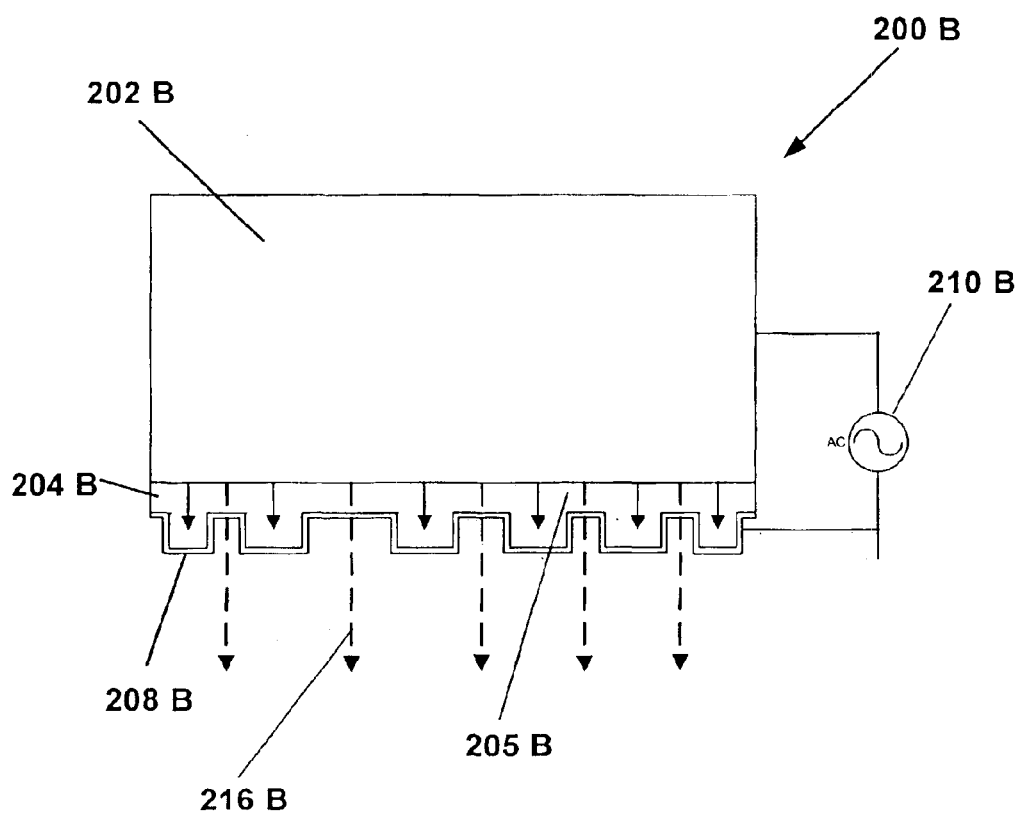

Another embodiment of a planar electron emitter (PEE) and integrated mask unit 200B in the Metal-Insulator-Metal configuration is shown schematically in FIG. 2B. A conducting substrate 202B is composed of aluminum or other suitable electrically conducting material and serves as the source of electrons (cathode) for the electron emitter. The conducting substrate 202B may be over-coated or chemically treated to form a thin insulating layer 204B, for example made from aluminum oxide ($Al_2O_3$) or other suitable insulating material. In the configuration shown in FIG. 2B, a mask 200B may be formed by chemically etching the exposed surface of the insulating layer 204B prior to overcoating with the metal overlay 208B.

In this configuration, the preferential spatial absorption and/or scattering of electrons occurs due to the spatially non-uniform quantum tunneling barrier of the insulating layer 204B. For example, the insulating layer 204B, prior to chemical etching, may be deposited or grown in sufficient thickness to absorb and/or scatter electrons that enter the insulating layer 204B from the metal substrate 202B. The subsequent chemical etching of the insulating layer 204B may be carded out until the etched thickness areas are sufficiently thin (similar to the thickness described above in FIG. 2A) such that electrons propagate through the insulating layer 204B only in those areas "thinned" by chemical etching.

To initiate electron emission from the planar electron emitter (PEE) and integrated mask unit 200B, an electrical potential (voltage) 210B is applied between the metal substrate 202B (negative lead) and the metal overlay 208B (positive lead). For the dimensions and materials shown above, a 5 volt potential may be sufficient for electrons to be emitted. With the applied voltage 210B, electrons from the surface of the metal substrate 202B may receive a sufficient driving force to quantum tunnel into the insulating layer 204B with sufficient velocity to propagate the entire thickness of the insulating layer 204B. And, those electrons transiting the insulating layer 204B in the "thinned" region 205B of the insulating layer 204B, continue on, propagating through the metal overlay 208B and exit the planar electron emitter (PEE) and integrated mask unit 200B as free-space propagating electrons 216B. The electrons 216B emitted from the metal overlay 208B are used for illuminating and exposing the resist layer on the substrate.

Figure 2C:
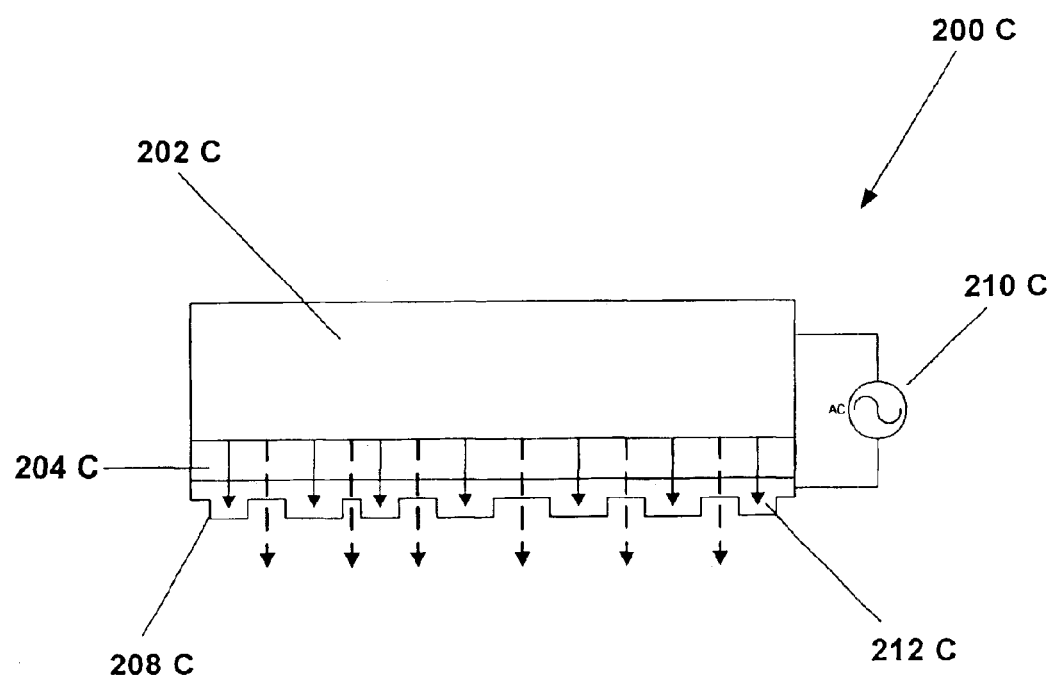

Another embodiment of a planar electron emitter (PEE) and integrated mask unit 200C in the Metal-Insulator-Metal configuration is shown schematically in FIG. 2C. A conducting substrate 202C may be composed of aluminum or other suitable electrically conducting material and serves as the source of electrons for the electron emitter. The substrate 202C may be over-coated or chemically treated with a thin insulating layer 204C which may be aluminum oxide ($Al_2O_3$) or other suitable insulating material such as silicon dioxide. The surface of the insulating layer 204C may be over-coated with metal overlay 208C. In the configuration shown in FIG. 2C, a mask unit 200C may be formed by at least two different methods. A voltage may be applied between the conducting substrate 202C and the metal overlay 208C using a power supply 210C of some sort.

In the first method of fabricating the mask unit 200C, the metal overlay 208C, prior to chemical etching, may be deposited or grown in sufficient thickness to absorb and/or scatter all electrons which may be entering the metal overlay 208C from the insulating layer 204C. The subsequent chemical etching of the metal overlay 208C may be carried out until the etched thickness areas are sufficiently thin (similar to the thickness described above in FIG. 2A) such that electrons may propagate through the metal overlay 208C only in those areas "thinned" by chemical etching.

In a second method of fabricating the mask unit 200C requires no direct chemical etching of the exposed metal overlay 208C surface. Instead, a layer of resist may be applied to the exposed surface of the metal overlay 208C, and the desired mask unit 200C structure may be fabricated in the resist by standard lithographic techniques.

In a third method of fabricating the mask unit 200C, a thin layer of metal overlay 208C is deposited over the insulating layer 204C. Regions of the metal overlay 208C are protected by portions of resist, while other portions of the metal overlay 208C are exposed. In a second metal overlaying step, additional metal is grown at the exposed regions, so that the thickness of the metal overlay 208C at those regions protected by the resist remain thin, while those portions 212C that were exposed during the second metal overlaying step are relatively thick, advantageously too thick to permit passage of electrons that have tunneled through the insulator layer 204C from the conducting substrate 202C to have been grown to a greater thickness.

In a fourth method of fabricating the mask unit 200C, a thick layer (typically at least 500 to 1000 Angstroms thick) of metal overlay 208C is deposited over the insulating layer 204C. The metal overlay 208C is then coated with resist material and treated via standard lithographic techniques to define mask geometries similar to those described above in the third method of fabrication. The metal overlay 208C is then chemically etched in those regions un-protected by resist, down to the insulating layer 204C. A thin layer of metal overlay is then deposited in the "etched wells" and the resist material may then be chemically removed. Or as an alternative, the resist material may be chemically removed prior to overcoating with a second layer of metal. In this embodiment, the metal overlay 208C may have two layers of metal in the "thick" region and 1 layer of metal in the "thinned" region. In both cases, electrons propagating through the metal overlay 208C may be totally absorbed and/or scattered in the thick regions and may propagate through and exit as free particles only in those areas of the metal overlay 208C that have been sufficiently thinned.

Figure 3A:
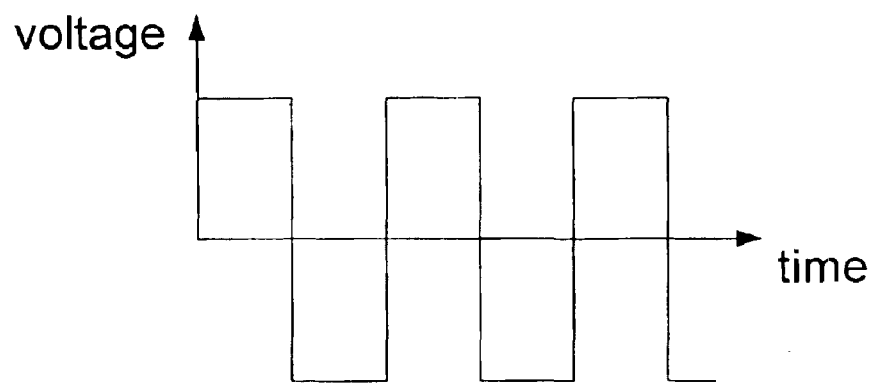
FIGS. 3A–3C present graphs representing different time-dependent electrical potentials applied to a planar electron emitter according to principles of the present invention.

It is an object of the present invention to increase the useful life of planar electron emitters of the type described above. Experimental PEEs of the type described above have been fabricated, tested, and found to have a limited lifetime both in a pulsed and continuous mode of operation. It is believed that the failure mechanism may involve the in-diffusion of metal atoms from the metal overlay region, the anode, into the insulating region, which contributes to "shorting out" the device, resulting in a catastrophic failure. In response to this, different methods have been developed to increase the useful life of the REE. The methods are designed to modify the mobility characteristics of the in-diffusing metal atoms penetrating into the insulating layer. The first approach comprises periodically reversing the polarity of the voltage applied between the conducting substrate and metal overlay. This can be better understood by referring to the voltage vs. time diagram shown in FIG. 3A. Applied voltage is represented on the vertical axis and time on the horizontal axis. A positive voltage represents a forward bias condition for the planar electron emitter, for example, the negative terminal of a battery or other electrical power source, connected to the conducting substrate, the cathode and the positive terminal connected to the metal overlay, the anode. A certain time period later, the voltage polarity is reversed, and during this period of reverse biasing, it is believed that at least some of the metal ions that have in-diffused into the insulating layer, driven by electric field forces, diffuse in the reverse direction back into the metal overlay region, thereby re-establishing the original Metal-Insulator-Metal (M-I-M) configuration. For the sake of functionally naming the configuration depicted in FIG. 3A, and to identify the differences in the upcoming alternative methods, this configuration is referred to as the "completely symmetric" configuration for the reverse bias approach, in that both the magnitude of the reverse bias voltage and the time interval of the reverse bias are equal to their forward bias counterparts. This procedure has been tested experimentally, and has been shown to increase the useful life of the planar electron emitter by a factor of three-fold.

Figure 3B:

Another technique utilizing the "reverse bias" technique is illustrated in the timing diagram shown in FIG. 3B. This configuration is the "asymmetric time interval" approach to applying the reverse bias. Although the magnitudes of the forward and reverse bias voltages are shown to be equal, the time interval for applying the reverse bias is shown to be approximately twice as long as for the forward bias case, although other ratios can be readily applied. Another perspective on this approach may be understood if one thinks of it as the "asymmetric energy" approach. The asymmetric energy approach incorporates the concept of an "engineering safety factor" to increase the probability that metal ions which may have diffused into the insulating layer during the forward bias condition, are driven back into the metal overlay region during the reverse bias time interval.

Figure 3C:
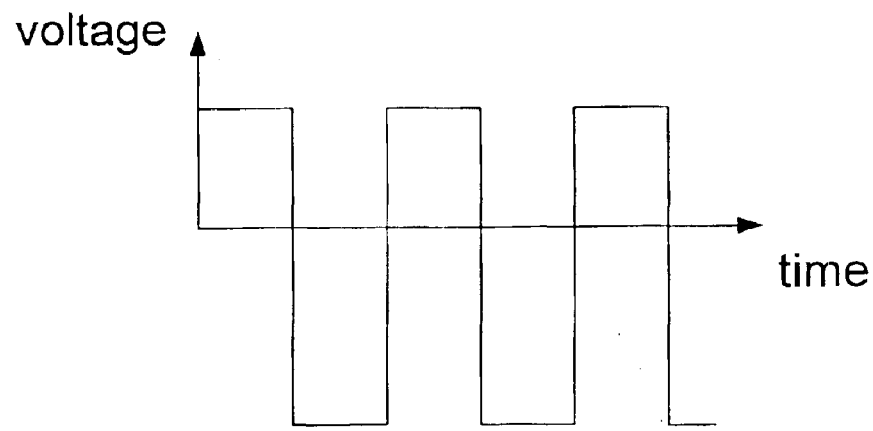

Another alternative technique utilizing the "reverse bias" technique is illustrated in the timing diagram shown in FIG. 3C. This configuration is the "asymmetric voltage" approach to applying the reverse bias. Although the magnitudes of the forward and reverse time intervals are shown to be equal, the magnitude of the reverse bias voltage is larger than the forward bias case. In the illustrated embodiment, the positive voltage time was about one half of the reverse voltage time. It will be appreciated that other ratios can be readily applied. Similar to the "asymmetric time interval" approach discussed above, the approach incorporates the concept of an "engineering safety factor" (again, via the asymmetric energy argument) to increase the probability that metal ions which may have diffused into the insulating layer during the forward bias condition, are driven back into the metal overlay region during the reverse bias time interval.

It will be appreciated that different shapes of waveforms may be applied to the planar electron emitter (PEE) and integrated mask unit 102. For example, rather than being applied as a square wave, as illustrated, the voltage may be applied with a sinusoidal or triangular waveform, or with some other type of waveform. Furthermore, the asymmetries in time and voltage may be reversed, with the longer times and greater voltages being applied in the forward bias direction.

It will also be appreciated that the type and magnitude of the reverse bias techniques described above may evolve over time. For example, the information gathered by the lifetime monitor, for example the internal impedance of the planar electron emitter PEE as the PEE ages, may be used to increase the life of the PEE by appropriately altering (e.g., increasing the time duration of reverse biasing or increasing the magnitude of the reverse bias voltage, or both) as the PEE ages.

The length of time the positive voltage is applied to the PEE depends on the desired duration of the electron beam. For example, under some conditions, a period of 100 msec time may be sufficient to expose the resist on the wafer. Furthermore, it may take a few 100's of msec to step the wafer to the next position. In such a case, the positive voltage may be applied to the PEE for a pulse length of 100 msec, while the negative voltage is applied during the at least a portion of the period that the stepper system needs to align the PEE to the next region on the wafer to be exposed. In other approaches, the voltage applied to the PEE may be stepped, and take on a number of different values during an exposure step-and-repeat cycle.

Another approach to extending the useful life of planar electron emitters centers on decreasing the mobility of the metal atoms to migrate (diffuse) into the insulating layer, in other words reducing the diffusion coefficient. Diffusion is a temperature dependent process. In many areas, the temperature dependence of the diffusion coefficient approximates an exponential behavior of the following form;

$$D \cong \text{constant} \cdot e^{-(\Delta E/KT)} \quad (1)$$

Where D is the diffusion coefficient, K is Boltzman's constant, T is the absolute temperature of the diffusing species, $\Delta E$ is the activation energy of the diffusion process, and the constant depends on the particulars of the materials. As shown is equation (1), the diffusion coefficient can become exceeding small as the temperature approaches absolute zero, in other words the potentially in-diffusing metal atoms may be nearly "frozen in place" at extremely low temperatures.

In order to test the planar electron emitter's (PEE's) potential increase in useful life at low temperatures, experimental devices were fabricated and tested while being subjected to cooling at liquid nitrogen temperatures—approximately 77 K. The liquid nitrogen cooled devices out-lived their non-cooled counterparts on average by a factor of thirty- to forty-fold. Given this, it may be possible to extend the useful life of the planar electron emitters (PEE's) even further by subjected them to even lower temperatures by using, say, liquid helium temperatures—around 4 K.

Figure 4:
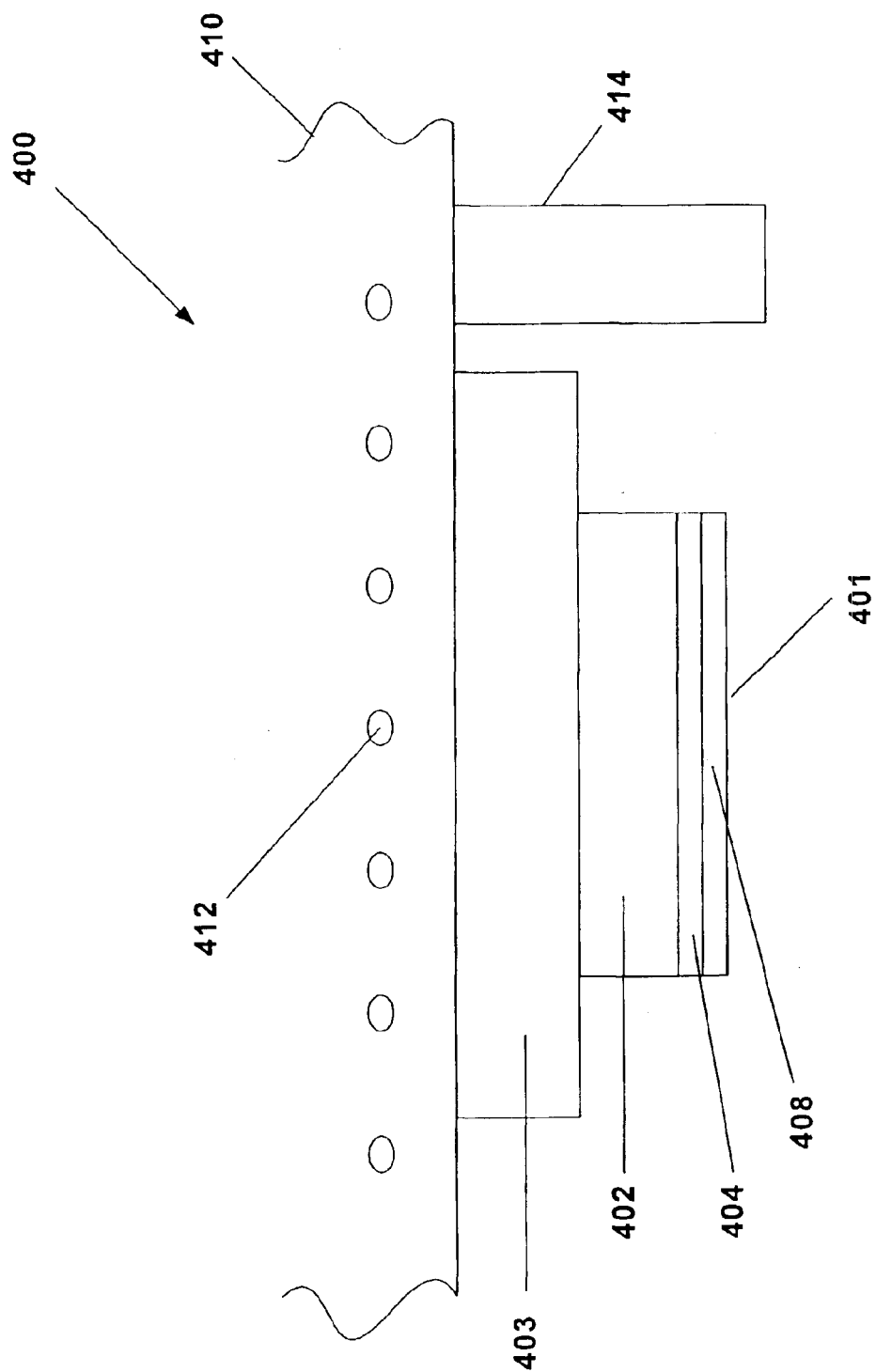
FIG. 4 schematically illustrates an embodiment of a cooled planar electron emitter according to principles of the present invention.

One embodiment of a planar electron emitter (PEE) with integrated temperature control unit 400 is shown schematically in FIG. 4. The planar electron emitter (PEE) 401 is shown in the Metal-Insulator-Metal (M-I-M) configuration, where the conducting substrate 402 may be attached to a mounting unit 403. The mounting unit 403 may be a thermoelectric (TE) cooler or other type of heat extracting device to assist in cooling the planar electron emitter (PEE). The planar electron emitter (PEE) 401 is shown with the insulating layer 404 sandwiched between the conducting substrate 402 and metal overlay 408 similar to the configuration depicted in FIG. 2A. The PEE 401 may be cooled to any desired temperature below room temperature, for example 20K below room temperature, below 100 K below room temperature, or further.

The mounting unit 403 may in turn be attached to a fluid cooling unit 410 having a series of fluid coolant ducts 412 for delivery of coolants such as liquid nitrogen, liquid helium, or other appropriate coolants. The cooling ducts are closed off form the vacuum chamber in which the wafer is positioned. The fluid cooling unit 410 may also have a temperature getter 414 device placed strategically to be at a lower temperature than the planar electron emitter (PEE) 401, so as to preferentially attract airborne contaminates in the vacuum chamber to the getter 414 and not to the PEE 401.

In one embodiment, the getter 414 device may be situated in the direct flow path of one (or more) of the fluid coolant ducts 412, whereas the planar electron emitter (PEE) 401 may not be in the direct path of a fluid coolant duct 412. In this configuration the getter 414 device may be cooled sooner than the planar electron emitter (PEE) 401 and may therefore preferentially attract airborne contaminants to its surface and not the planar electron emitter (PEE) during the initial start-up of the instrument.

In another embodiment, the fluid coolant unit 410 may time sequence the onset of delivery of cooling fluid to the individual fluid cooling ducts 412. In this embodiment, the fluid coolant unit 410 may initially only route cooling fluid to the appropriate cooling ducts 412 delivering coolant fluid directly in the vicinity of the getter 414 device. As before, the getter 414 device may be cooled sooner than the planar electron emitter (PEE) 401 and may therefore preferentially attract airborne contaminants to its surface and not the planar electron emitter (PEE) during the initial start-up of the instrument.

It will be appreciated that other methods may be employed to preferentially cool the getter 414 device prior to cooling the planar electron emitter (PEE) 401, and that alternative geometries for the getter device 414 may be employed, for example a ring shield around the PEE 401. Also, the present invention contemplates further, that during the operation of the instrument, it may be useful to maintain the temperature of the getter 414 device at a temperature lower than the planar electron emitter (PEE) 401. This may prove to be beneficial if the vacuum chamber becomes leaky or malfunctions and allows contaminants to enter the chamber after the onset of electron bombardment.

It will be appreciated that other approaches to controlling the temperature of the PEE 401 and temperature getter 414 may be employed.

In another embodiment, the present invention contemplates employing the "reverse bias" procedure(s) described earlier, in simultaneous concert with the low temperature method(s) described above. All possible combinations and permutations of the reverse bias and low temperature methods of extending the lifetime of the PEE are contemplated.

It will be noted that operation of a PEE without either reverse biasing or cooling leads to a lifetime on the order of 30,000–40,000 exposure shots of 100 msec each. A thirty-fold increase in the lifetime in the lifetime of the PEE, by cooling to liquid nitrogen temperatures, leads to a lifetime of approximately 1 million shots, which is in desired range for a commercial device Reverse biasing leads to a further increase in device lifetime. Accordingly, the inventions described here enable the PEE to be a serious contender for next generation lithographic procedures. As noted above, the present invention is applicable to lithographic techniques and is believed to be particularly useful in the manufacture of semiconductor components having feature sizes of 50 nm or less. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A planar electron emitter system for lithography, comprising:
    a planar electron emitter having
        a first electrically conducting layer;
        a second electrically conducting layer that emits electrons; and
        an insulating layer disposed between the first and second electrically conducting layers;
        wherein the second electrically conducting layer emits electrons when held at an electrical potential that is sufficiently positive with respect to an electrical potential applied to the first electrically conducting layer; and
    a source of electric potential electrically connected to the first and second electrically conducting layers so as to impose an electrical potential across the insulating layer, the source of electric potential being adapted so that a polarity of the electrical potential difference between the first and the second electrically conducting layers is reversible.

2. A system as recited in claim 1, wherein the electrical potential across the insulating layer spends a greater fraction of time with the second electrically conducting layer held at a negative potential relative to the first electrically conducting layer than with the second electrically conducting layer held at a positive potential relative to the first electrically conducting layer.

3. A system as recited in claim 1, wherein the magnitude of the electrical potential across the insulating layer is larger when i) the electrical potential of the second electrically conducting layer less than the electrical potential of the first electrically conducting layer than when ii) the electrical potential of the second electrically conducting layer greater than the electrical potential of the first electrically conducting layer.

4. A system as recited in claim 1, wherein the planar electron emitter is patterned so as to emit a patterned beam of electrons.

5. A system as recited in claim 4, wherein the emitting surface of the second electrically conducting layer is patterned.

6. A system as recited in claim 4, wherein the insulating layer is patterned.

7. A system as recited in claim 4, further comprising a pattern layer between at least portions of the insulating layer and the second electrically conducting layer.

8. A system as recited in claim 1, further comprising a temperature control unit thermally coupled to the planar electron emitter to control an operating temperature of the planar electron emitter.

9. A method of exposing a resist on a wafer using a planar electron emitter, comprising:
    applying a first electrical potential of a first polarity to the planar electron emitter so that the planar electron emitter emits electrons incident on the resist to expose a first portion of the resist; and
    applying a second electrical potential of a second polarity, opposite to the first polarity, to the planar emitter so that the planar emitter does not emit electrons.

10. A method as recited in claim 9, further comprising moving the exposed portion of the resist so that a second, unexposed portion of resist is proximate the planar electron emitter, and applying the first electrical potential of the first polarity to the planar electron emitter so that the planar electron emitter emits electrons incident on the second portion of resist.

11. A method as recited in claim 9, further comprising cooling the planar electron emitter.

12. A method as recited in claim 11, further comprising temperature gettering a vacuum chamber in which the planar electron emitter is disposed before cooling the planar electron emitter.

13. A method as recited in claim 9, further comprising applying a time varying electrical potential across the planar electron emitter, applying the time varying electrical potential including applying the first electrical potential and applying the second electrical potential, wherein the time varying electrical potential spends a greater amount of time in the second polarity than in the first polarity.

14. A method as recited in claim 9, wherein the magnitude of the second electrical potential is greater than the magnitude of the first electrical potential.

15. A method as recited in claim 9, further comprising measuring electrical characteristics of the planar electron emitter and adjusting at least one of a duration and a magnitude of the second electrical potential in response to the measured electrical characteristics.

16. A system for lithography, comprising:
    a planar electron emitter having
        a first electrically conducting layer;
        a second electrically conducting layer that emits electrons; and
        an insulating layer disposed between the first and second electrically conducting layers;
        wherein the second electrically conducting layer emits electrons when held at an electrical potential that is sufficiently positive with respect to an electrical potential applied to the first electrically conducting layer; and
    a temperature control unit thermally coupled to the planar electron emitter for controlling temperature of the planar electron emitter.

17. A method as recited in claim 16, wherein the temperature control unit controls the temperature of the planar electron emitter to a temperature more than 20 K below room temperature.

18. A method as recited in claim 16, wherein the temperature control unit controls the temperature of the planar electron emitter to a temperature more than 100 K below room temperature.

19. A system as recited in claim 16, wherein the temperature control unit cools the planar electron emitter.

20. A system as recited in claim 16, wherein the temperature control unit is cooled by a fluid.

21. A system as recited in claim 17, wherein the fluid is a cryofluid.

22. A system as recited in claim 17, wherein the fluid is liquid nitrogen.

23. A system as recited in claim 17, wherein the fluid is liquid helium.

24. A system as recited in claim 16, wherein the temperature control unit comprises a thermoelectric cooler.

25. A system as recited in claim 16, further comprising a vacuum chamber, the planar electron emitter being positioned within the vacuum chamber, and a temperature getter disposed within the vacuum chamber.

26. A system as recited in claim 16, wherein the planar electron emitter is patterned so as to project a patterned beam of electrons.

27. A system as recited in claim 26, wherein the emitting surface of the second electrically conducting layer is patterned.

28. A system as recited in claim 26, wherein the insulating layer is patterned.

29. A system as recited in claim 26, further comprising a pattern layer disposed between at least portions of the insulating layer and the second electrically conducting layer.

30. A system as recited in claim 16, further comprising an electrical power supply coupled to the first and second electrically conducting layers, the electrical power supply being adapted to apply a voltage of a first polarity between the first and second electrically conducting layers, and a voltage of a second polarity, inverted relative to the first polarity, between the first and second electrically conducting layers.

31. A system as recited in claim 16, further comprising a projection system to project electrons in a pattern from the planar electron emitter to an exposure position for a resist layer with a 1:1 magnification.

32. A method of exposing a resist on a wafer using a planar electron emitter, comprising:
applying a first electrical potential of a first polarity to the planar electron emitter so that the planar electron emitter emits electrons incident on the resist to expose a first portion of the resist; and
controlling the temperature of the planar electron emitter at a temperature below an ambient temperature.

33. A method as recited in claim 32, further comprising controlling the temperature of the planar electron emitter at a temperature at least 20 K below ambient temperature.

34. A method as recited in claim 32, further comprising controlling the temperature of the planar electron emitter at a temperature at least 100 K below ambient temperature.

35. A method as recited in claim 32, wherein controlling the temperature of the planar electron emitter includes cooling the planar electron emitter with a cryofluid.

36. A method as recited in claim 35, wherein cooling the planar electron emitter with a cooling fluid includes cooling the planar electron emitter with at least one of liquid nitrogen and liquid helium.

37. A method as recited in claim 32, wherein cooling the planar electron emitter includes cooling the planar electron emitter with a thermoelectric cooler.

38. A method as recited in claim 32, further comprising temperature gettering a vacuum chamber in which the planar electron emitter is positioned before cooling the planar electron emitter.

39. A method as recited in claim 32, further comprising applying a second electrical potential to the planar electron emitter, the second electrical potential having a polarity inverted relative to the polarity of the first electrical potential.

40. A method as recited in claim 32, further comprising moving the exposed portion of the resist so that a second, unexposed portion of resist is proximate the planar electron emitter, and applying the first electrical potential of the first polarity to the planar electron emitter so that the planar electron emitter emits electrons incident on the second portion of resist.

41. A stepper system for lithography, comprising:
a planar electron emitter having
a first electrically conducting layer;
a second electrically conducting layer that emits electrons; and
an insulating layer disposed between the first and second electrically conducting layers;
wherein the second electrically conducting layer emits electrons when held at an electrical potential that is sufficiently positive with respect to an electrical potential applied to the first electrically conducting layer;
a temperature control unit thermally connected to the planar electron emitter for controlling the temperature of the planar electron emitter;
a substrate mount for holding a substrate having a resist layer facing the planar electron emitter; and
an adjustable stage, the mount being fixed relative to the adjustable stage, the adjustable stage being adapted to move a wafer, when the mount holds a wafer, relative to the planar electron emitter so that successively different portions of resist on the wafer are exposed to electrons emitted from the second electrically conducting layer.

42. A stepper system as recited in claim 41, further comprising a temperature getter disposed proximate the planar electron emitter.

43. A stepper system as recited in claim 41, wherein the temperature control unit is cooled using liquid nitrogen.

44. A stepper system as recited in claim 41, wherein the temperature control unit is cooled using liquid helium.

45. A stepper system as recited in claim 41, further comprising a stage control unit coupled to control movement of the adjustable stage.

46. A stepper system as recited in claim 41, further comprising a controller coupled to control the temperature control unit and the planar electron emitter.

47. A stepper system as recited in claim 41, further comprising a vacuum housing enclosing the planar electron emitter, the substrate mount, and the translating device, and a vacuum system coupled to the vacuum housing to pull a vacuum on the vacuum housing.

48. A stepper system as recited in claim 41, further comprising a mask exchange unit for exchanging the planar electron emitter.

49. A stepper system as recited in claim 41, further comprising a wafer exchange unit for exchanging a wafer held in the substrate mount.

50. A stepper system as recited in claim 41, further comprising a projection system to focus a pattern of electrons emitted from the planar electron emitter to a wafer held on the substrate mount.

51. A stepper system for lithography, comprising:
a planar electron emitter having
a first electrically conducting layer;
a second electrically conducting layer that emits electrons; and
an insulating layer disposed between the first and second electrically conducting layers;
wherein the second electrically conducting layer emits electrons when held at an electrical potential that is sufficiently positive with respect to an electrical potential applied to the first electrically conducting layer;

a voltage source connected to the first and second electrically conducting layers, the voltage source being adapted to apply a first voltage having a first polarity between the first and second electrically conducting layers, and a second voltage having a second polarity opposite to the first polarity between the first and second electrically conducting layers;

a substrate mount for holding a substrate having a resist layer facing the planar electron emitter; and an adjustable stage, the mount being fixed relative to the adjustable stage, the adjustable stage being adapted to move a wafer, when the mount holds a wafer, relative to the planar electron emitter so that successively different portions of resist on the wafer are exposed to electrons emitted from the second electrically conducting layer.

52. A stepper system as recited in claim 51, further comprising a stage control unit coupled to control movement of the adjustable stage.

53. A stepper system as recited in claim 51, further comprising a controller coupled to control the temperature control unit and the planar electron emitter.

54. A stepper system as recited in claim 51, further comprising a vacuum housing enclosing the planar electron emitter, the substrate mount, and the translating device, and a vacuum system coupled to the vacuum housing to pull a vacuum on the vacuum housing.

55. A stepper system as recited in claim 51, further comprising a mask exchange unit for exchanging the planar electron emitter.

56. A stepper system as recited in claim 51, further comprising a wafer exchange unit for exchanging a wafer held in the substrate mount.

57. A stepper system as recited in claim 51, further comprising a projection system to focus a pattern of electrons emitted from the planar electron emitter to a wafer held on the substrate mount.

58. A planar electron emitter system for lithography, comprising:

a planar electron emitter having
   a first electrically conducting layer;
   a second electrically conducting layer that emits electrons; and
   an insulating layer disposed between the first and second electrically conducting layers;
   wherein the second electrically conducting layer emits electrons when held at an electrical potential that is sufficiently positive with respect to an electrical potential applied to the first electrically conducting layer, and the and planar electron emitter has a lifetime in excess of one million exposure shots of approximately 100 msec.

* * * * *